(12) United States Patent
Cheng

(10) Patent No.: US 7,717,626 B2
(45) Date of Patent: May 18, 2010

(54) OPTICAL FIBER CONNECTOR

(75) Inventor: Yung-Chang Cheng, Tu-cheng (TW)

(73) Assignee: Hon Hai Precision Ind. Co., Ltd, Taipei Hsien (TW)

( * ) Notice: Subject to any disclaimer, the term of this patent is extended or adjusted under 35 U.S.C. 154(b) by 0 days.

(21) Appl. No.: 12/220,498

(22) Filed: Jul. 24, 2008

(65) Prior Publication Data

US 2009/0028498 A1    Jan. 29, 2009

(30) Foreign Application Priority Data

Jul. 24, 2007    (TW) .............................. 96212053 U

(51) Int. Cl.
G02B 6/36 (2006.01)
G02B 6/38 (2006.01)
G02B 6/00 (2006.01)

(52) U.S. Cl. .............................. 385/77; 385/53; 385/56; 385/58; 385/65; 385/76; 385/88; 385/89; 385/92; 385/93; 385/94; 385/139

(58) Field of Classification Search .................... 385/53, 385/56, 58, 65, 76, 77, 88, 89, 92–94, 139
See application file for complete search history.

(56) References Cited

U.S. PATENT DOCUMENTS 6,368,150 B1 * 4/2002 Zheng et al. ............. 439/541.5
6,739,765 B1 * 5/2004 Liu .............................. 385/92
6,869,297 B2 * 3/2005 Caveney ..................... 439/138
6,905,254 B2 * 6/2005 Yang et al. .................... 385/88
7,114,856 B2 * 10/2006 Ohbayashi et al. ............ 385/88
2004/0076378 A1 * 4/2004 Takeda et al. ................. 385/77

* cited by examiner

Primary Examiner—Brian M. Healy
Assistant Examiner—Hung Lam
(74) Attorney, Agent, or Firm—Andrew C. Cheng; Wei Te Chung; Ming Chieh Chang

(57) ABSTRACT

An optical fiber connector (100) includes a first insulative housing (1), a door (2) assembled in the first housing and an elastic piece (3) with one end retained in the first housing and the other end elastically abutting against the door. The first housing defines a top face (10), a front face (11) connecting with the top face and a pair of sidewalls (13). The first housing further defines a receiving cavity (111) opening through the front face thereof, and each sidewall defines a recess (112) opening through the top face and the inner surface of the receiving cavity near an opening of the receiving cavity. The door is movably assembled at the opening of the receiving cavity and defines a pair of shafts (22) received in the recesses. Each recess integrally defines a protrusion (113) over the shaft therein, so as to prevent the shafts from breaking off the recesses.

20 Claims, 6 Drawing Sheets

OPTICAL FIBER CONNECTOR

BACKGROUND OF THE INVENTION

1. Field of the Invention

The present invention relates to an fiber optic connector, and particularly to an fiber optic connector having a door for preventing entering of dust and vapor.

2. Description of the Related Art

Chinese Patent Issued Number 2674470Y discloses an fiber optic connector having a door for preventing entering of dust. The fiber optic connector includes an insulative housing having an optical element, an elastic door and a shell. The housing defines a receiving cavity for receiving a mating connector opening through a mating face thereof, an opening running through a top wall and a pair of sidewalls vertical to the top wall. Each sidewall defines a recess in the upper portion of the inner surface. A pair of bosses of the elastic door is retained in the recesses. An elastic piece extends from the front end of the shell and elastically abuts against the door, so that the door is positioned in the front opening of the receiving cavity without insertion of a mating connector, and the door pivots towards the receiving cavity when a mating connector is inserted. Since the recess opens upwards, the door might break off the housing.

Japanese Unexamined Patent No. 6-331859 discloses another fiber optic connector. The door pivots in a pair of holes of the housing. It's difficult to assembly the door on the housing.

Hence, a new design which can prevent the door from breaking off the housing is provided.

SUMMARY OF THE INVENTION

Accordingly, an object of the present invention is to provide an fiber optic connector which can prevent the door from breaking off the housing effectively.

In order to achieve the object set forth, an optical fiber optic connector includes a first insulative housing, a door assembled in the first housing and an elastic piece with one end retained in the first housing and the other end elastically abutting against the door. The first housing defines a top face, a front face connecting with the top face and a pair of sidewalls. The first housing further defines a receiving cavity opening through the front face thereof, and each sidewall defines a recess opening through the top face and the inner surface of the receiving cavity near an opening of the receiving cavity. The door is movably assembled at the opening of the receiving cavity and defines a pair of shafts received in the recesses. Each recess integrally defines a protrusion over the shaft therein, so as to prevent the shafts from breaking off the recesses.

Other objects, advantages and novel features of the invention will become more apparent from the following detailed description of the present embodiment when taken in conjunction with the accompanying drawings.

DETAILED DESCRIPTION OF THE INVENTION

Figure 1:
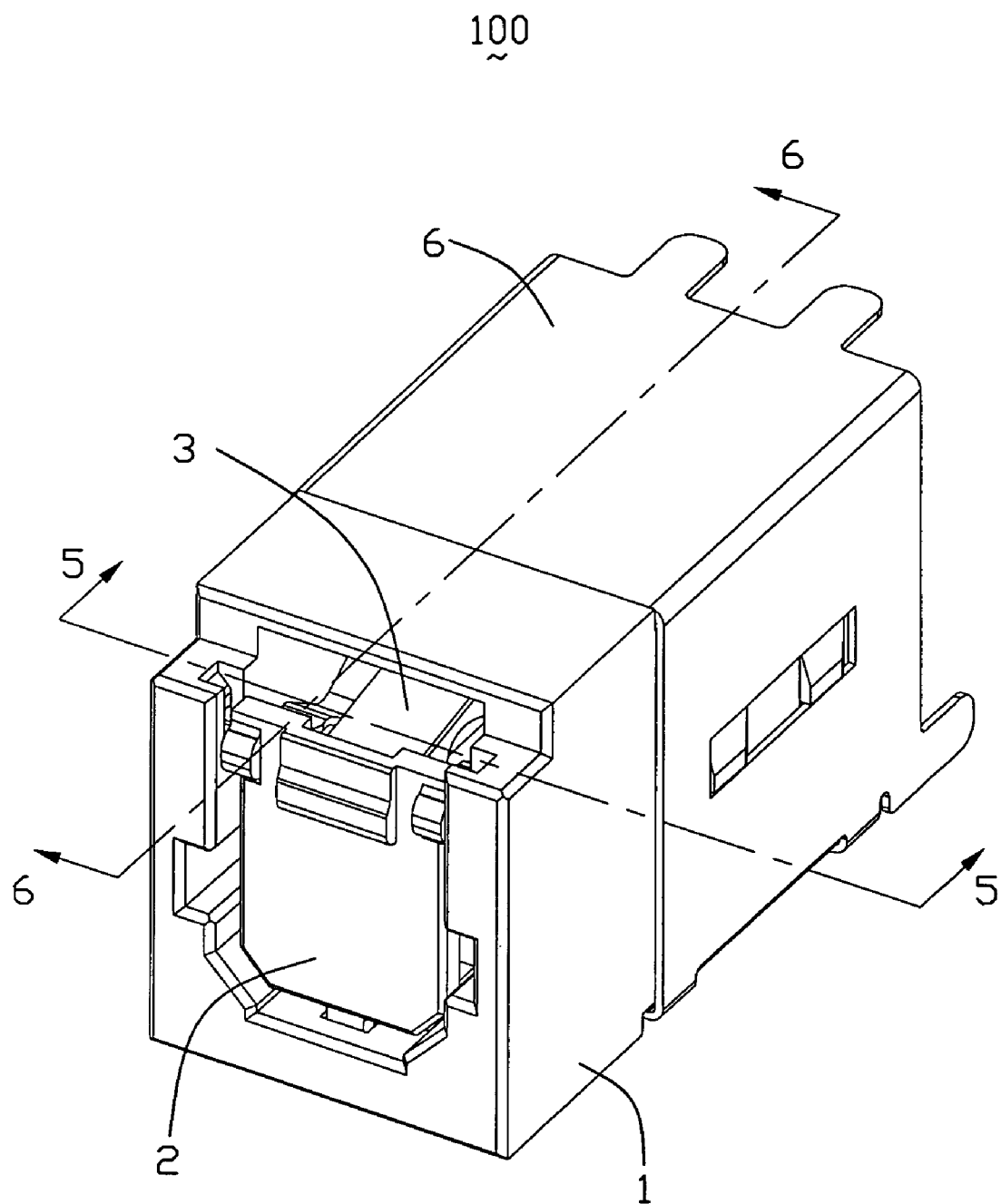
FIG. 1 is a perspective view of an fiber optic connector in accordance with a preferred embodiment of the present invention.

Reference will now be made to the drawing figures to describe a preferred embodiment of the present invention in detail.

Figure 2:
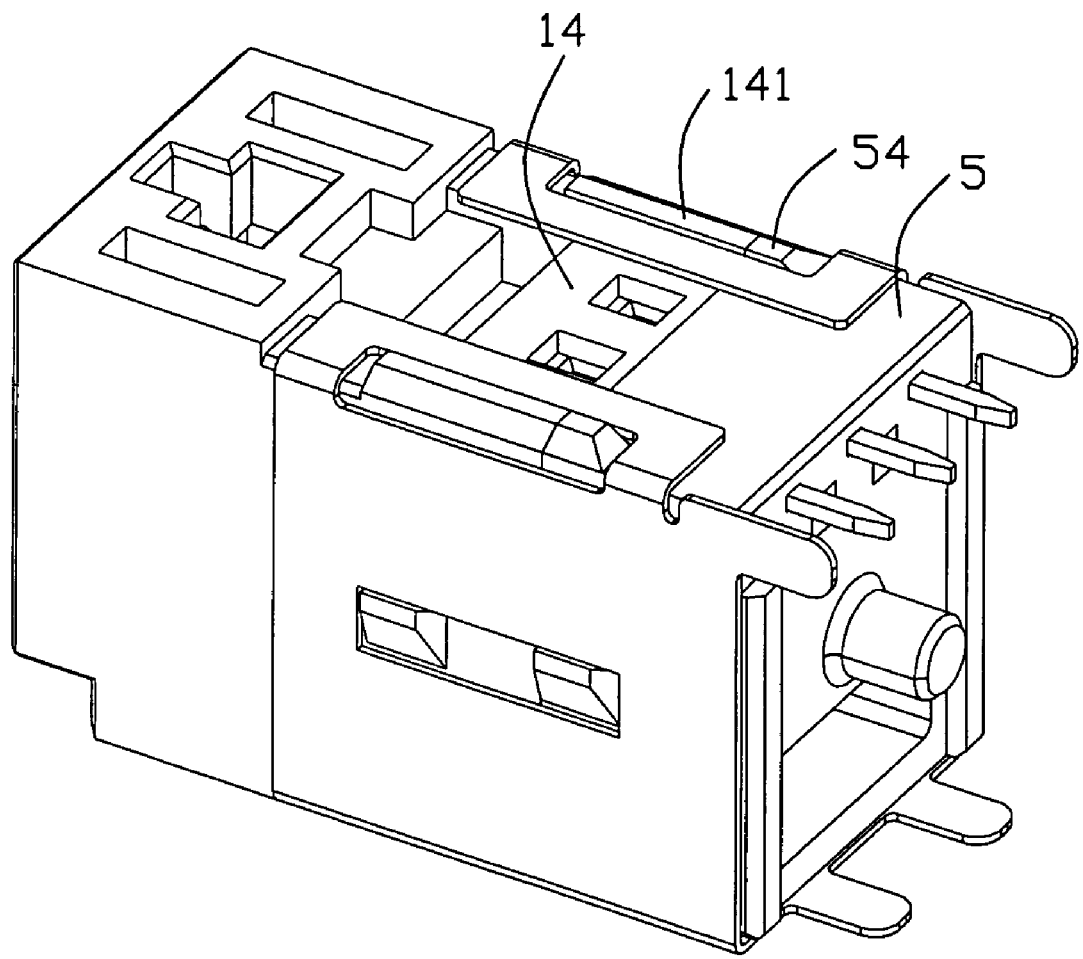
FIG. 2 is another perspective view of the fiber optic connector shown in FIG. 1.
Figure 3:
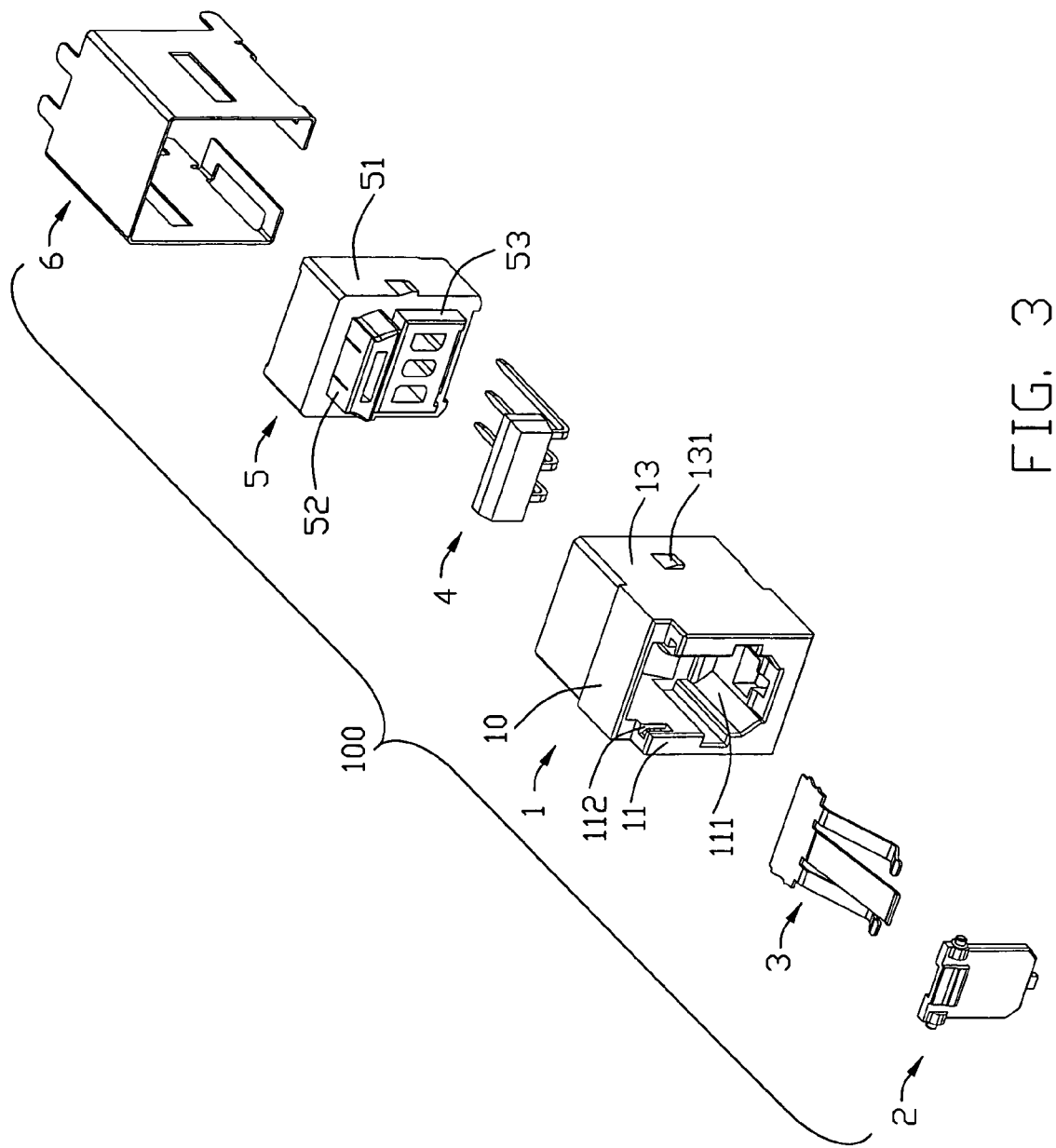
FIG. 3 is an exploded view of the fiber optic connector.

Referring to FIG. 1 to FIG. 3, the fiber optic connector 100 described in this preferred embodiment includes a first insulative housing 1, a door 2 assembled in the first housing 1, an elastic piece 3 retained in the first housing 1, an optical element 4 received in the first housing 1, a second insulative housing 5 and a shell 6 covering the first and second housing 1, 5.

Figure 4:
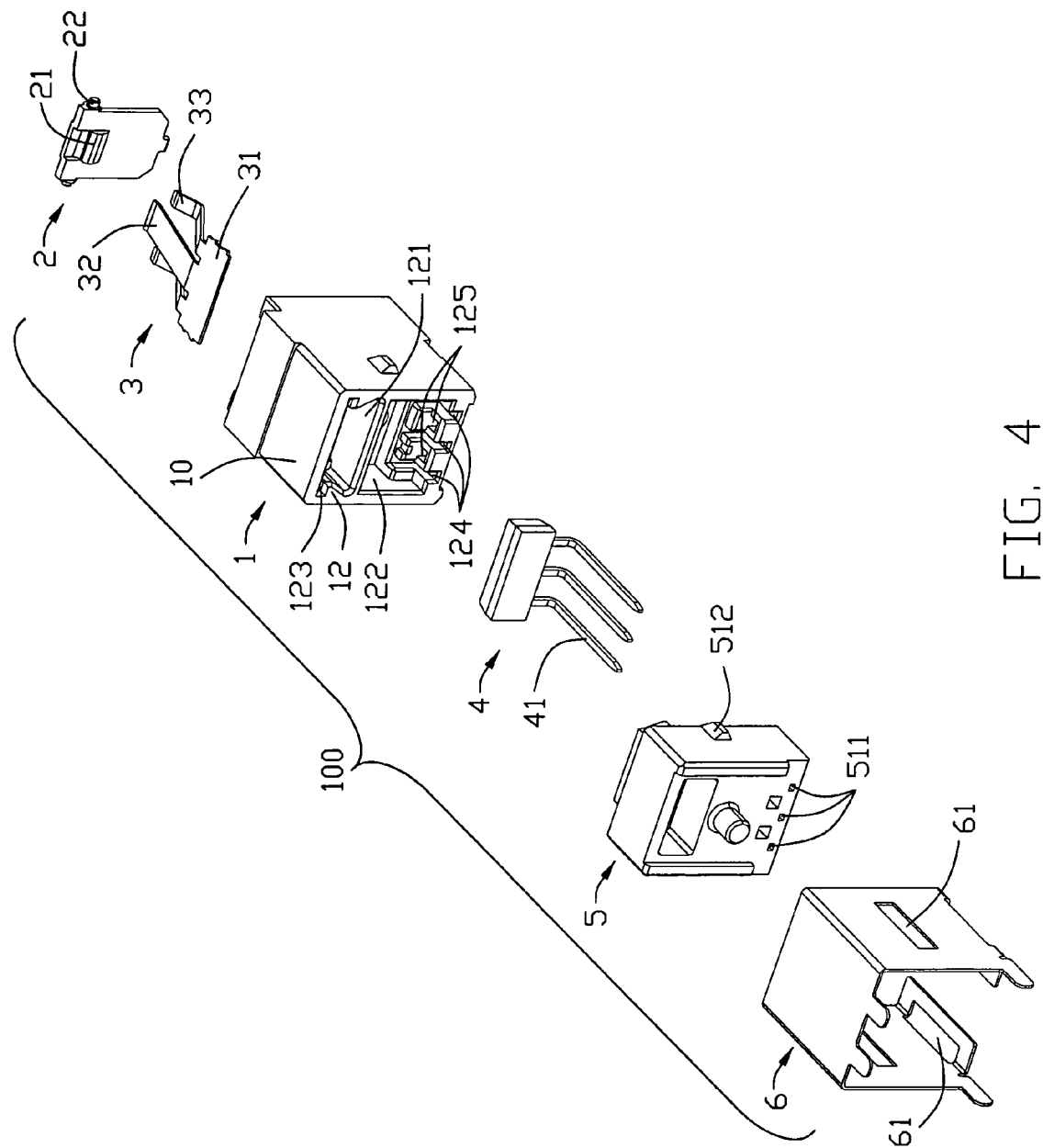
FIG. 4 is another view of the fiber optic connector shown in FIG. 3.
Figure 5:
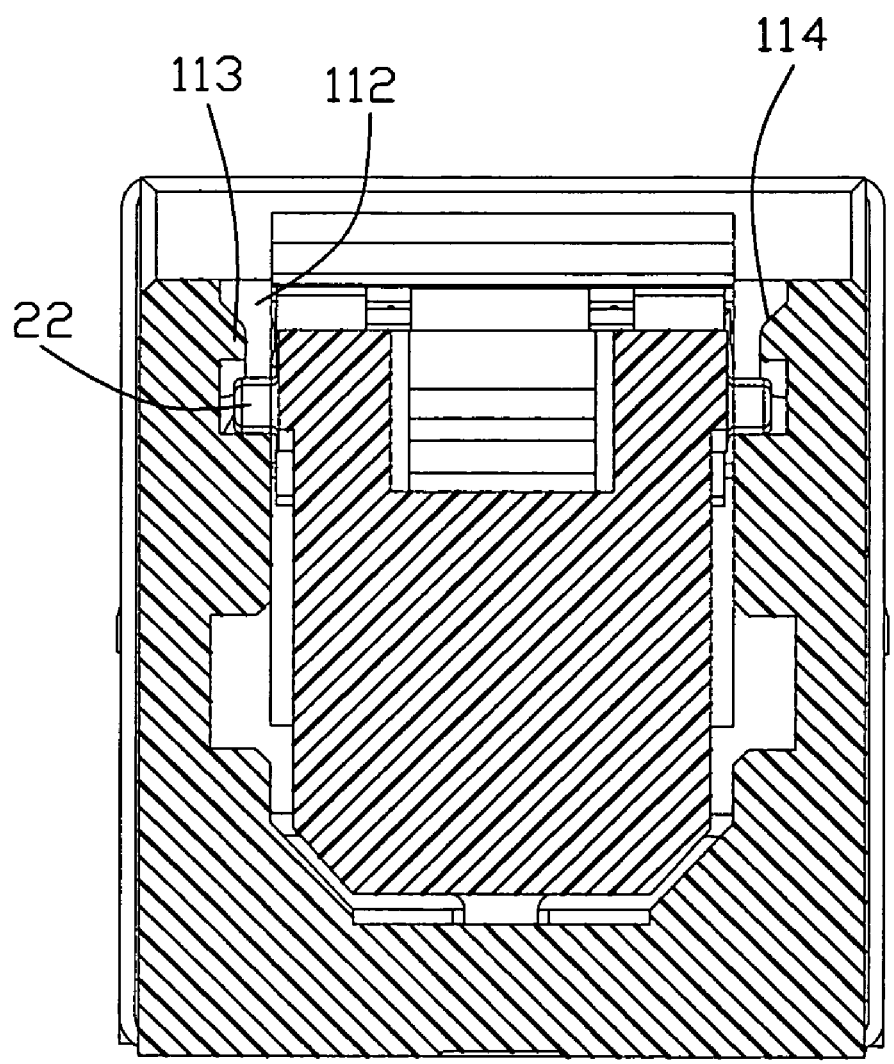
FIG. 5 is a cross sectional view taken along line 5-5 of FIG. 1.

Referring to FIG. 3 to FIG. 4, the first insulative housing 1 of a rectangular block defines a front face 11 as a mating face, a rear face 12 opposite to the front face 11, a top face 10, a bottom face 14 opposite to the top face 10 and a pair of sidewalls 13 connecting the top face 10 with the bottom face 14. The first housing 1 defines a receiving cavity 111 for receiving a mating connector opening through the mating face 11 thereof, and two separate receiving rooms 121, 122 opening through the rear face 12 thereof. The second receiving room 122 is under the first receiving room 121. The first housing 1 further defines a receiving groove 123 communicating with the first receiving room 121. The receiving groove 123 is on top of the first receiving room 121. Each sidewall 13 defines a recess 112 near the opening of the receiving cavity 111 in the inner surface. The recesses 112 open through the top face 10 and the inner surfaces. As FIG. 5 shown, each recess 112 defines a protrusion 113 projecting towards the receiving cavity 111. The top of the protrusion 113 slant downwards to form a guiding face 114. The two protrusions 113 extend oppositely from the inner sides of the recesses 112 in a extending direction vertical to a mating direction. The extending length of each protrusion 113 is shorter than corresponding depth of the recess 112 along said extending direction.

The elastic piece 3 defines a fixing portion 31, an elastic contacting portion 32 extending forwards from the fixing portion 31 and a pair of elastic portions 33 bending downwards from the fixing portion 31. The elastic portions 33 are arranged in two sides of the contacting portion 32. The elastic piece 3 is received and retained in the receiving groove 123, the contacting portion 32 and the elastic portions 33 extend into the receiving cavity 111. The second receiving room 122 defines a plurality of slots 124 in the inner bottom surface, the optical element 4 is received in the second receiving room 122 and the soldering legs 41 are received in the corresponding slots 124.

The second insulative housing 5 defines a base portion 51 and two retaining portions 52, 53 extending from a same face of the base portion 51. The first retaining portion 52 is received and retained in the first receiving room 121 to retain the fixing portion 31. The second retaining portion 53 is retained in the second receiving room 122 with a plurality of protrusions (not shown) defined in the bottom engaging with the corresponding concave portions 125 defined in the second receiving room 122. The second housing 5 is retained in the rear of the first housing 1 so as to retain the optical element 4 in the second receiving room 122 steadily. The soldering legs 41 extend out of the slots 124 and run through the slots 511 defined in the base portion 51 to be soldered in the PCB as FIG. 2 shown. The shell 6 defines a plurality of retaining holes 61 in the sidewalls and bottom walls, and the shell 6 covers the housing with the retaining holes 61 engaging with the corresponding protrusions 131, 512, 141, 54 defined in the first and second housing 1, 5.

Figure 6:
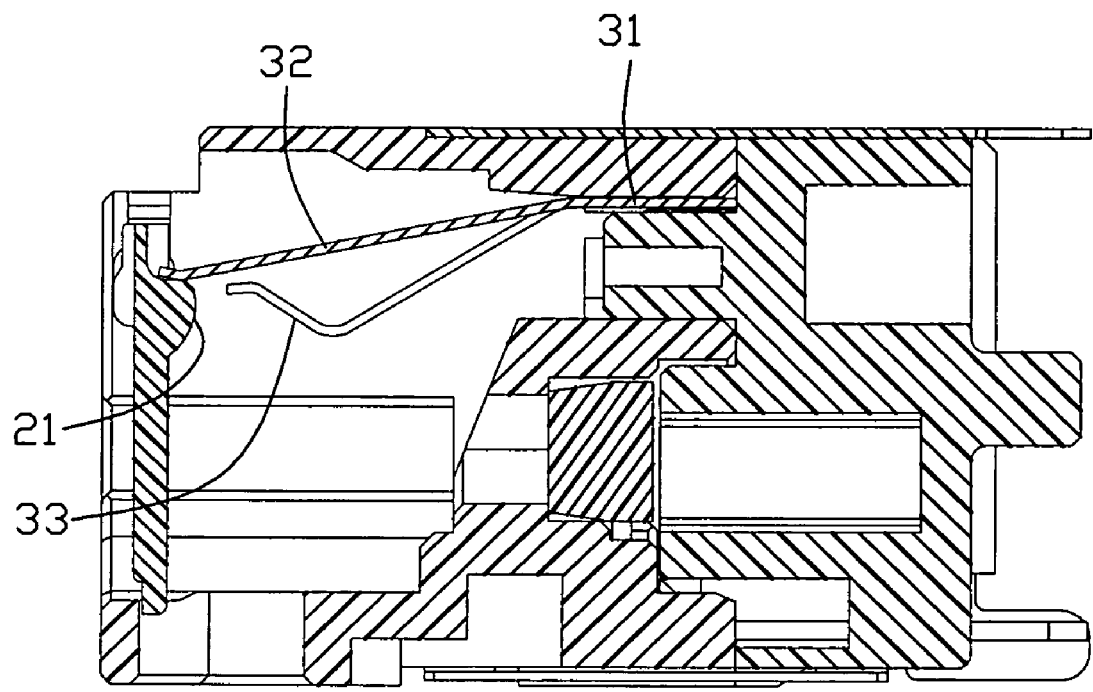
FIG. 6 is a cross sectional view taken along line 6-6 of FIG. 1.

Referring to FIG. 4, the door 2 defines a projecting portion 21 facing to the receiving cavity 111 and a pair of shafts 22 at the upper of the two side thereof. Clearly shown in FIG. 5, the shafts 22 stride the protrusions 113 and then are retained in the recesses 112. The protrusions 113 block the shafts 22 to prevent the door 2 from upwardly moving when the door 2 rotates. Clearly shown in FIG. 6, the contacting portion 32 elastically abuts against the projecting portion 21 to ensure the door 2 to be positioned in the opening of the receiving cavity 111 when no mating connector is inserted. When a mating connector is inserted into, the door 2 is urged to rotate towards the receiving cavity 111 and jundied the elastic piece 3. The extending length of the protrusions 113 is benefit for assembly of the shafts 22.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fiber optic connector comprising:
   a first insulative housing defining a top face, a front face connecting with the top face, a pair of sidewalls, and a receiving cavity defined into the front face thereof, and each sidewall defining a recess opening through the top face and an inner surface of the first housing near an opening of the receiving cavity;
   a door movably assembled at the opening of the receiving cavity, and including a pair of shafts rotationally received in the recesses; and
   an elastic piece directly retained in the first housing with one piece constantly downwardly abutting against an upper portion of the door;
   wherein each recess defines a protrusion integrally extending towards the receiving cavity and disposed beyond the shaft therein, so as to prevent the shafts from breaking off the recesses; wherein
   each recess is essentially constantly exposed upwardly toward an exterior so as to allow the door to be downwardly assembled to the first housing around said opening from the exterior under condition that the recess is still constantly or easily upwardly exposed to the exterior after the whole connector is assembled.

2. The fiber optic connector as described in claim 1, wherein each protrusion defines a guiding face slanting downwards.

3. The fiber optic connector as described in claim 2, wherein a length of the protrusion is shorter than a corresponding depth of the recess.

4. The fiber optic connector as described in claim 1, wherein the first housing defines a receiving groove, and the door defines a projecting portion facing to the receiving cavity, the elastic piece is directly retained in the first housing with one end received in the receiving groove and the one piece elastically abutting against the projecting portion.

5. The fiber optic connector as described in claim 4, further including an optical element, the first housing defines a first and second receiving rooms opening through a rear face opposite to the front face thereof, the first receiving room communicates with the receiving grooves and the optical element is received in the second receiving room.

6. The fiber optic connector as described in claim 5, further including a second insulative housing retained in the rear portion of the first housing, the second housing retains the optical element in the second receiving room steadily.

7. The fiber optic connector as described in claim 6, further including a shell having a plurality of retaining holes therein, and the shell covers the first and second housings with the retaining holes engaging with the first and second housings.

8. A fiber optic connector comprising:
   an insulative housing defining a receiving cavity therein with a front opening communicating said receiving cavity and with an exterior in a front-to-back direction;
   a moveable door pivotally mounted upon the housing and substantially enclosing said front opening;
   complementary interengaging structures formed on both said housing and said moveable door to only allow the door to be downwardly assembled to the housing in a vertical direction while still being inwardly rotatable about a pivot which extends along said complementary interengaging structures; and
   an elastic piece retained to the housing directly with one piece constantly downwardly abutting against an upper portion of the door; wherein
   said complementary interengaging structures include a pair of recesses formed around the front opening and a pair of pivotal shafts formed on two sides of the door received in the corresponding recesses, respectively; wherein
   each of said recesses is further equipped with a protrusion constantly downwardly constraining the corresponding shaft so as to cooperate with the piece for retaining said door in position with regard to the housing.

9. The fiber optic connector as claimed in claim 8, wherein said complementary interengaging structures are configured a recess-and-shaft pattern.

10. The fiber optic connector as claimed in claim 8, further comprising an insulative base assembled with a rear side of the housing.

11. The fiber optic connector as claimed in claim 10, wherein said base cooperates with the housing to retainably sandwich an optical element therebetween.

12. The fiber optic connector as claimed in claim 10, wherein said elastic piece is sandwiched between the housing and the base in a front-to-back direction.

13. A fiber optic connector comprising:
   an insulative housing defining a receiving cavity therein with a front opening communicating said receiving cavity with an exterior in a front-to-back direction;
   a moveable door pivotally mounted upon the housing around said front opening; and
   an elastic piece retained to the housing directly with a first piece constantly downwardly abutting against an upper section of a back side portion of the door and with a second piece extending into the receiving cavity and spaced from the door when said door is in a closed position while abutting against a middle section of the back side portion of the door after the door is pivotally lifted up to an open position by a plug which is inserted into the receiving cavity through the front opening.

14. The fiber optic connector as claimed in claim 13, wherein both said first and second pieces extend in a cantilevered manner.

15. The fiber optic connector as claimed in claim 13, further including an insulative base assembled to the housing.

16. The fiber optic connector as claimed in claim 15, wherein said base cooperates with the housing to securely sandwich an optical element therebetween.

17. The fiber optic connector as claimed in claim 15, wherein said elastic piece is sandwiched between the housing and the base in a front-to-back direction.

18. The fiber optic connector as claimed in claim 1, wherein said elastic piece further includes another piece extending into the receiving cavity and spaced from the door for supportably abutting against a back side of the door when said door is rotationally lifted up by a plug which is inserted into the receiving cavity through the opening.

19. The fiber optic connector as claimed in claim 8, wherein said pair of recesses are still constantly or easily upwardly exposed to the exterior after the whole connector is assembled.

20. The fiber optic connector as claimed in claim 13, wherein the housing defines around the front opening a pair of recesses which communicate with the exterior upwardly so as to allow the door to be downwardly assembled to the housing, and wherein a pair of protrusions are formed in the recesses, respectively, for cooperation with the first piece to downwardly hold the door in position with regard to the housing under condition that the recesses are still constantly and easily upwardly exposed to the exterior after the whole connector is assembled.

* * * * *